United States Patent [19]

Wickham

[11] Patent Number: 4,478,460
[45] Date of Patent: Oct. 23, 1984

[54] INTERLOCK VALVE FOR RAILWAY BRAKING SYSTEM VALVE ASSEMBLY

[75] Inventor: David J. Wickham, Chippenham, England

[73] Assignee: Westinghouse Brake and Signal Co. Ltd., Chippenham, England

[21] Appl. No.: 416,074

[22] Filed: Sep. 8, 1982

[30] Foreign Application Priority Data

Sep. 11, 1981 [GB] United Kingdom ............... 8127544

[51] Int. Cl.³ ............................................. B60T 15/02
[52] U.S. Cl. ...................................... 303/68; 303/33; 303/86
[58] Field of Search ............... 303/86, 81–83, 303/66, 60, 38, 28–36, 40, 37, 39, 68–80, 41, 42, 43, 44, 45, 46, 57, 84 R, 25–27

[56] References Cited

U.S. PATENT DOCUMENTS 3,707,314 12/1972 Paginton ........................ 303/69 X
4,125,292 11/1978 Worbois et al. .................... 303/36
4,163,587 8/1979 Limozin et al. ................. 303/81 X
4,378,950 4/1983 Hart et al. ....................... 303/36

Primary Examiner—Douglas C. Butler
Attorney, Agent, or Firm—Larson and Taylor

[57] ABSTRACT

This invention relates to a railway braking system in which a drop in brake pipe pressure calling for brake application initiates a pilot pressure and this pilot pressure is used to operate other valves pneumatically to effect braking. In this system, during the initial part of a brake application, air flows to atmosphere through a pilot exhaust choke. To avoid problems during release of the braking, it is proposed to isolate or restrict this pilot exhaust choke during at least the initial part of the brake application stage. To achieve this, an interlock valve is introduced into a passage between a release ball valve and a pilot exhaust choke. The interlock valve is operated by a diaphragm biassed by a spring and separating two chambers. Brake pipe pressure is applied to the first chamber and auxiliary reservoir pressure to the second chamber. A very small drop in brake pipe pressure closes the valve and cuts off connection between the release ball valve and the pilot exhaust choke.

4 Claims, 1 Drawing Figure

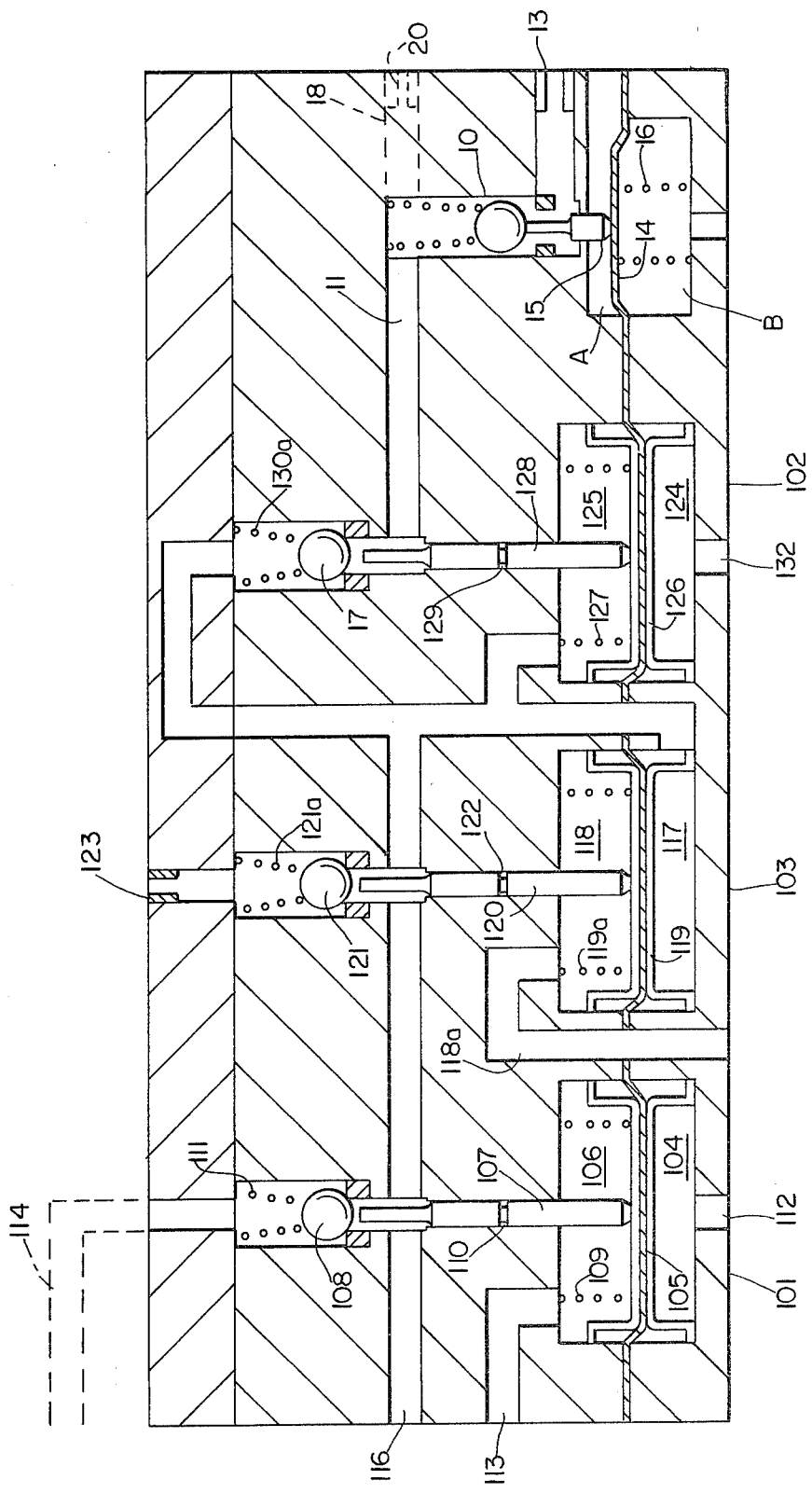

INTERLOCK VALVE FOR RAILWAY BRAKING SYSTEM VALVE ASSEMBLY

FIELD OF THE INVENTION

This invention relates to a bi-stable operator or valve assembly for a railway braking system of the kind described in the specification of our co-pending application No. 416,079, filed Sept. 8, 1982, "Control Valve Arrangement".

BACKGROUND OF THE INVENTION

In the above-identified application, a system is described in which a drop in brake pipe pressure calling for a brake application initiates a pilot pressure. This pilot pressure is used to operate other valves pneumatically to effect braking.

During the initial part of an application of the bi-stable operator, air flows to atmosphere through the pilot exhaust choke. Similarly, during the initial stages of a release, air is feeding into the pilot chamber of the bi-stable operator at the same time as it is feeding to atmosphere via the pilot exhaust choke. This means that the pilot maintaining choke has to be small relative to the pilot exhaust choke. However, the pilot exhaust choke cannot be above a certain size otherwise pilot pressure would never reach a pressure within 1½ p.s.i. of brake pipe pressure to cause the release valve to close.

As a result of the necessary relationship in sizes of these chokes, a limit is placed on the rate at which the pilot chamber can be exhausted and hence switch the piloted valves to their release position.

SUMMARY OF THE INVENTION

According to the invention, in a valve assembly for a railway braking system, means are provided to isolate the pilot exhaust choke or to restrict the choke so as to prevent or reduce flow of air to atmosphere via the release valve during at least the initial part of the application stage.

The means may comprise an interlock valve between the release valve ball valve and the pilot exhaust choke. This valve may be operated by a differential between brake pipe and auxiliary reservoir pressures in such a way that the interlock valve closes at a lesser difference between these pressures than the difference between these pressures which causes the opening of the application valve.

This means that before air is fed into the pilot chambers via the application valve, the pilot exhaust choke feed to atmosphere is cut-off enabling the pilot chambers to quickly attain the necessary pressure for the release valve to close. Since the exhaust choke is cut-off during application, it can be made much larger so that during release when the interlock valve opens, pilot pressure can be quickly dissipated through this much larger exhaust choke.

An alternative arrangement provides for a pilot exhaust choke to be restricted during application by the interlock valve rather than cut-off completely. This may be done by having parallel chokes to atmosphere of which one is isolated by the interlock valve. Such an arrangement is particularly advantageous where auxiliary reservoir pressure is used as the feed to the application valve of the bi-stable operator. In the latter case, the stability of the complete valve against application for a certain rate of brake pipe drop is then dependent on the rate of AR pressure dissipation to atmosphere, in contrast to the arrangement shown in FIG. 2 of our co-pending application mentioned above, in which the necessary stability is obtained by the rate of dissipation of auxiliary reservoir pressure back into brake pipe pressure via the auxiliary reservoir charging choke and sensitivity choke.

Stability obtained as a combination of these two methods is also feasible.

In the earlier proposal for the complete valve arrangement the AR cut-off and BC exhaust valves and the quick service and pilot maintaining valves were operated by pilot pressure against a relatively low load spring. This meant that pilot pressure had to be reduced to say 15 p.s.i. before switching of the valves occurred and the ability to introduce a large pilot exhaust choke would be important. However, in the present proposal, these valves are operated with a differential between pilot pressure and brake pipe pressure and the fall in pilot pressure required to cause switching is minimal.

BRIEF DESCRIPTION OF THE DRAWING

In the accompanying drawing a valve assembly incorporating the present invention is shown.

DETAILED DESCRIPTION OF THE PREFERRED EMBODIMENT

The drawing is a modified version of FIG. 1 of our copending application mentioned above which is herein incorporated by reference. A description of the basic valve assembly found in that patent application follows.

The pneumatically-operated diaphragm assembly shown in the single FIGURE comprises three modules, 101, 102 and 103. Module 101 is the brake application module, module 102 is the release module and module 103 is an optional pilot pressure-maintaining module.

The application module 101 includes a resilient diaphragm 105 which acts as a dividing wall between two chambers 104 and 106. Abutting, but not connected to diaphragm 105, is a valve stem 107 which operates an on-off or ball valve 108. The stem 107 passes through a seal 110.

The diaphragm 105 is biassed by a spring 109 to the position shown in the FIGURE. The ball valve 108 is biassed by a spring 111 to its closed position.

An auxiliary reservoir (AR) pressure is applied to the chamber 104 via port 112, and brake pipe pressure (BP) via port 113 to the chamber 106. Either AR pressure or BP pressure is applied via pipe 114 to the ball valve 108. If BP is used, it is applied through a non-return valve (not shown).

A fall in BP will cause diaphragm 105 to flip-over which, in turn, will open the ball valve 108 to allow either AR or BP (whichever is employed) to be applied via passage 116 which acts as the pilot pressure to initiate application of the brakes and to operate other functions pneumatically.

Module 102 is the release module and has similar chambers 124 and 125 and diaphragm 126, abutting a piston stem 128, which extends through a seal 129 to operate a ball valve 17, held on its seat by a spring 130A. One side of ball valve 17 is connected to atmosphere through an interlock valve 10 and the other side of ball valve 17 is connected to pilot pressure line 116 and to chamber 127 and to chamber 117 of the third or pilot-maintaining module 103.

The chamber 124 of module 102 is connected to BP via port 132. Diaphragm 126 is biassed to the position shown by a spring 127.

Module 103, the pilot pressure-maintaining module, is mechanically similar to the other two modules, comprising chambers 117, 118, separated by diaphragm 119 biassed by spring 119a. The lower chamber 117 is connected to the pilot pressure line 116 and to the release module as described above. Upper chamber 118 is connected via passage 118a to atmosphere. Diaphragm 119 abutts a piston stem 120 which extends through a seal 122 and operates a ball valve 121, biassed to its closed position by a spring 121a. The lower side of ball valve 121 is connected to the pilot pressure line 116 and the upper side is connected to AR via a pilot pressure-maintaining choke 123.

The three diaphragms 105, 119 and 126, may form portions of a single sheet of plastic sandwich material.

The operation of the system is as follows. The ball valves 108 and 121 and corresponding diaphragms 105 and 119 are in the positions shown in the figure but the release valve is normally open—i.e. ball balve 17 is off its seat and diaphragm 126 is in the opposite position to that shown in the figure. To make a brake application, the operator reduces brake pressure relative to auxiliary reservoir pressure by as little as 1 p.s.i. This causes the diaphragms 105 in application module 101 to flip-over rapidly so as to open the on-off or ball valve 108, which is supplied with either AR or BP pressure. This auxiliary reservoir pressure, or brake pipe pressure, is then supplied as pilot pressure to initiate all the necessary functions, as described above.

This pilot pressure would go directly to exhaust via open ball valve 17, until the release module 102 operates to close ball valve 17, and this would cause a loss of pressure. To limit this loss, interlock valve 10 is employed adjacent the ball valve 17 of the release module 102, as described subsequently.

As soon as this pilot pressure approaches BP in the chamber 118, ball valve 17 closes to prevent further pressure loss under action of spring 130a—i.e. the diaphragm 126 and ball valve 17 assume the positions actually shown in the figure.

Other parts of the valve system, when they operate, cause AR pressure to fall until it equalizes BP. Air is then trapped in the pilot pressure line 116 and, if there were the slightest leak, this pressure would be lost. This pressure in the pilot line 116 holds all the other valves and modules in their correct positions so loss must be avoided.

It might be necessary to hold this position for an hour or more. To avoid this problem, the third module is introduce—i.e. the pilot pressure-maintaining module 103. This module 103 responds to pilot pressure which enters chamber 117 to cause diaphragm 119 to flip-over and open its ball valve 121 against pressure of spring 121a. This action feeds pressure from the auxiliary reservoir through a small choke 123 past the ball 121 into the chamber 117 and the pilot pressure circuit including line 116. This maintains any minor leakage.

As long as AR pressure does not drop below BP pressure, the brake will not be released. When brake pipe pressure is increased to more than 1½ p.s.i. above auxiliary reservoir pressure, module 102—i.e. the release module-will operate. Pilot pressure is equivalent in these conditions to auxiliary reservoir pressure, since it is maintained by auxiliary reservoir pressure derived from module 103.

Once the brake pipe pressure increases by 1½ p.s.i. above auxiliary reservoir pressure module 102, diaphragm 126 flips-over to open ball valve 17 so as to exhaust pilot pressure via the interlock valve 10. As explained subsequently, if not for interlock valve 10, the slightest opening of the release ball valve 17 would cause pilot pressure to drop very rapidly. When it drops to the operating pressure of module 103, diaphragm 119 will flip-over to close its ball valve 121 to cut-off the pilot-maintaining pressure supply.

As mentioned above, either auxiliary reservoir pressure or brake pipe pressure could be used as the pilot pressure. If auxiliary reservoir pressure is used, a check valve is not needed. If brake pipe pressure is used, the check valve (not shown) is necessary to prevent back flow of auxiliary pressure from the pilot-maintaining module into brake pipe when BP is lower than AR,-e.g. in emergency application. The advantage of using brake pipe pressure is that it gives a quick service action because of the small pressure reduction caused as brake pipe pressure fills the pilot circuit.

The assemblies are balanced as much as is necessary. At all critical operations, air reservoir and brake pipe pressures are adequately balanced, thus reducing the need for a great deal of critical balancing. For example, the ball valve 108, 110, of application module 101 has a valve seat diameter close to the stem diameter so that the forces substantially balance. At any critical situation, this ball valve/stem balance is achieved.

In the figure, interlock valve 10 has been introduced in the passage 11 between the release ball valve 17 and the pilot exhaust choke 13. The ball valve 10 is operated by a diaphragm 14 via a valve stem 15. Diaphragm 14 separates two chambers A and B.

Brake pipe pressure is applied to chamber B and auxiliary reservoir pressure to chamber A. The diaphragm 14 is biassed by a spring 16 so that a very small predetermined drop in brake pressure causes valve 10 to close and thus to cut-off the connection between release ball valve 12 and the pilot exhaust choke 13. This drop in pressure would normally be less than 1 p.s.i., the pressure at which the application valve operates. Thus, during the application stage, the ball valve 10 is closed but during the release stage, it is open.

An alternative arrangement is illustrated in dotted line. An extra port 18 provides a by-pass to smaller pilot exhaust choke 20 so that when ball valve 10 choses, the exhaust of air to atmosphere is restricted since exhaust choke 13 is cut-off and only the smaller exhaust choke 20 remains open to atmosphere.

Having thus described our invention what we claim is:

1. A valve assembly for a pneumatically operated railway braking system of the kind in which a drop in brake pipe pressure, calling for brake application, initiates a pilot pressure and this pilot pressure is used to operate other valves pneumatically to effect braking, the assembly including:
a brake release valve,
a source of pilot pressure air,
means for connecting the source of pilot pressure air to the release valve so as to operate the valve to release the brakes in two stages, an initial stage and a final stage,
a pilot pressure air exhaust choke to choke the flow of pilot pressure leaving the exhaust valve, and
means for isolating the pilot pressure air exhaust choke so as to prevent the flow of pilot pressure air to atmosphere during at least the initial part of the brake application.

2. A valve assembly according to claim 1, and in which said isolating means comprises an interlock valve between the release valve and the pilot exhaust choke.

3. A valve assembly according to claim 2 and in which said interlock valve is operable by a differential between brake pipe and auxiliary reservoir pressures in such a way that the interlock valve closes at a lesser difference between these pressures than the difference between these pressures which causes the opening of the application valve.

4. A valve assembly for a pneumatically operated railway braking system of the kind in which a drop in brake pipe pressure, calling for brake application, initiates a pilot pressure and this pilot pressure is used to operate other valves pneumatically to effect braking, the assembly including:
- a brake release valve,
- a source of pilot pressure air,
- means for connecting the source of pilot pressure air to the release valve so as to operate the valve to release the brakes in two stages, an initial stage and a final stage,
- a pilot pressure air exhaust choke to choke the flow of pilot pressure leaving the exhaust valve, and
- means for restricting the pilot pressure air exhaust choke so as to reduce flow of pilot pressure air to atmosphere during at least the initial part of the brake application.

* * * * *